(12) United States Patent
Wolge

(10) Patent No.: US 8,244,741 B2
(45) Date of Patent: Aug. 14, 2012

(54) METHOD AND APPARATUS FOR EXTRACTING INFORMATION FROM A DATABASE

(75) Inventor: Hakan Wolge, Lund (SE)

(73) Assignee: QlikTech International AB (SE)

( * ) Notice: Subject to any disclaimer, the term of this patent is extended or adjusted under 35 U.S.C. 154(b) by 414 days.

(21) Appl. No.: 12/504,695

(22) Filed: Jul. 17, 2009

(65) Prior Publication Data

US 2010/0017436 A1    Jan. 21, 2010

Related U.S. Application Data

(60) Provisional application No. 61/081,761, filed on Jul. 18, 2008.

(30) Foreign Application Priority Data

Jul. 18, 2008  (SE) ...................................... 0801708

(51) Int. Cl.
   *G06F 17/00*   (2006.01)
(52) U.S. Cl. ....................................... 707/751
(58) Field of Classification Search .................... 707/751
   See application file for complete search history.

(56) References Cited

U.S. PATENT DOCUMENTS

| | | | |
|---|---|---|---|
| 5,263,159 A * | 11/1993 | Mitsui ................... | 1/1 |
| 5,666,526 A * | 9/1997 | Reiter et al. ........... | 1/1 |
| 6,037,938 A | 3/2000 | Wolke | |
| 6,115,703 A | 9/2000 | Bireley et al. | |
| 6,236,986 B1 * | 5/2001 | Gestrelius et al. ..... | 1/1 |
| 6,275,819 B1 | 8/2001 | Carter | |
| 6,341,281 B1 | 1/2002 | MacNicol et al. | |
| 6,347,312 B1 | 2/2002 | Byrne et al. | |
| 6,453,321 B1 | 9/2002 | Hill et al. | |
| 6,678,681 B1 * | 1/2004 | Brin .............................. | 707/754 |
| 6,728,699 B1 * | 4/2004 | Lautzenheiser et al. ............. | 1/1 |

(Continued)

FOREIGN PATENT DOCUMENTS

GB    2346231    3/2003

(Continued)

OTHER PUBLICATIONS

Jonsson et al., "Performance and Overhead of Semantic Cache Management", ACM Transactions on Internet Technology, vol. 6, No. 3, pp. 302-331 (Aug. 1, 2006).

*Primary Examiner* — James Trujillo
*Assistant Examiner* — Kurt Mueller
(74) *Attorney, Agent, or Firm* — Williams Mullen

(57) ABSTRACT

A method for retrieving calculation results, wherein a first input or selection causes a first calculation on a database to produce an intermediate result, and a second selection or input causes a second calculation on the intermediate result, producing a final result. These results are cached with digital fingerprint identifiers. A first identifier is calculated from the first selection, and a second identifier is calculated from the second selection and the intermediate result. The first identifier and intermediate result are associated and cached, while the second identifier and final result are associated and cached. The final result may be then retrieved using the first and second selections or inputs by recalculating the first identifier and searching the cache for the first identifier associated with the intermediate result. Upon locating the intermediate result, the second identifier may be recalculated to locate the cached second identifier associated with the final result.

20 Claims, 4 Drawing Sheets

U.S. PATENT DOCUMENTS

| | | |
|---|---|---|
| 7,058,621 B1 * | 6/2006 | Wolge ................................. 1/1 |
| 2001/0049685 A1 | 12/2001 | Carey et al. |
| 2002/0129003 A1 | 9/2002 | Bakalash et al. |
| 2003/0115188 A1 * | 6/2003 | Srinivasa et al. .................. 707/3 |
| 2004/0059719 A1 | 3/2004 | Gupta et al. |
| 2006/0230024 A1 | 10/2006 | Lei et al. |
| 2006/0294088 A1 | 12/2006 | Stecher |
| 2008/0091646 A1 | 4/2008 | Al-Omari et al. |

FOREIGN PATENT DOCUMENTS

| WO | WO 03/081464 | 10/2003 |
|---|---|---|

\* cited by examiner

METHOD AND APPARATUS FOR EXTRACTING INFORMATION FROM A DATABASE

CROSS-REFERENCE TO RELATED APPLICATIONS

The present application claims the benefit of Swedish patent application No. 0801708-9, filed on Jul. 18, 2008, and U.S. provisional application No. 61/081,761, filed on Jul. 18, 2008, all of which are incorporated herein by reference.

TECHNICAL FIELD

The present invention relates to techniques for extracting information from a database, and in particular to techniques that involve a sequential chain of main calculations comprising a first main calculation which operates a first selection item on a data set representing the database to produce a first result, and a second main calculation which operates a second selection item on the first result to produce a second result.

BACKGROUND ART

It is often desired to extract specific information from a database, and specifically to summarize a large amount of data in the database and present the summarized data to a user in a lucid way. Such data processing is normally carried out by a computer, and may require significant memory capability and processing power of the computer. The data processing may aim at creating a large data structure commonly known as a multidimensional cube, which in turn may be accessed by the user to explore the data of the database, for example by visualizing selected data in pivot tables or graphically in 2D and 3D charts. An example of an efficient algorithm for creating such a multidimensional cube is known from U.S. Pat. No. 7,058,621, which is incorporated herein by reference.

This prior art algorithm, like many other algorithms that operate on data in a database, involves a sequential chain of main calculations, in which the result of one main calculation is used an input data by a subsequent main calculation. For example, in the context of U.S. Pat. No. 7,058,621, the data records in the database is read into primary memory, whereupon a user may select one or more variables, and optionally a value or range of values for each such variable, thereby causing the algorithm to extract a corresponding subset of the data records in the database. The extracted subset forms an intermediate result. The multidimensional cube is then calculated by evaluating a selected mathematical function on the extracted subset, wherein the evaluation of the mathematical function is made based on a selected set of calculation variables, and wherein the dimensions of the cube are given by a selected set of classification variables.

Although the prior art algorithm is efficient, it may still need to carry out a large number of operations to create the multidimensional cube, especially if large amounts of data are to be analyzed. In such situations, the algorithm may set undesirably high requirements on the processing hardware and/or present a calculation time that is undesirably long.

SUMMARY

It is an object of the invention to at least partly overcome one or more of the above-identified limitations of the prior art.

This and other objects, which will appear from the description below, are at least partly achieved by means of a method, a computer readable medium and an apparatus according to the independent claims, embodiments thereof being defined by the dependent claims.

A first aspect of the invention is a computer-implemented method for extracting information from a database, said method comprising a sequential chain of main calculations comprising a first main calculation which operates a first selection item on a data set representing the database to produce a first result, and a second main calculation which operates a second selection item on the first result to produce a second result, said method further comprising caching the first and second results by: calculating a first selection identifier value as a function of at least the first selection item, and a second selection identifier value as a function of at least the second selection item and the first result; and storing the first selection identifier value and the first result, and the second selection identifier value and the second result, respectively, as associated objects in a data structure. The extracted information may comprise a grouping, sorting or aggregation of data in the database.

Thus, in the method according to the first aspect, the first and second results are cached in computer memory and made available for re-use in subsequent iterations of the method, thereby reducing the need to execute the first and/or second main calculations for extracting the information. The re-use may involve calculating the first and/or second selection identifier values during a subsequent iteration and accessing the data structure to potentially retrieve the first and/or second result.

In one embodiment, the method further comprises using the data structure to find the second result based on the first selection item and the second selection item, wherein the step of using comprises the sub-steps of: (a) calculating the first selection identifier value as a function of at least the first selection item; (b) searching the objects of the data structure based on the first selection identifier value to locate the first result; (c) if the first result is found in sub-step (b); calculating the second selection identifier value as a function of the first result and the second selection item, and searching the objects of the data structure based on the second selection identifier value to locate the second result; (d) if the first result is not found in sub-step (b), executing the first main calculation to produce the first result, calculating the second selection identifier value as a function of the first result and the second selection item, and searching the objects of the data structure based on the second selection identifier value to locate the second result; and (e) if the second result is not found in sub-step (c) or (d), executing the second main calculation to produce the second result.

In one embodiment, the method further comprises the step of calculating a first result identifier value as a function of the first result, wherein the step of storing further comprises the steps of storing the first selection identifier value and the first result identifier value as associated objects in the data structure, and storing the first result identifier value and the first result as associated objects in the data structure.

In one embodiment, the method further comprises using the data structure to find the second result based on the first selection item and the second selection item, wherein the step of using comprises the sub-steps of: (a) calculating the first selection identifier value as a function of at least the first selection item; (b) searching the objects of the data structure based on the first selection identifier value to locate the first result identifier value, and searching the objects of the data structure based on the first result identifier value to locate the first result; (c) if the first result is found in sub-step (b), calculating the second selection identifier value as a function of the first result and the second selection item, searching the objects of the data structure based on the second selection identifier value to locate the second result; (d) if the first result identifier value or the first result is not found in sub-step (b), executing the first main calculation to produce the first result, calculating the second selection identifier value as a function of the first result and the second selection item, and searching the objects of the data structure based on the second selection identifier value to locate the second result; and (e) if the second result is not found in sub-step (c) or (d), executing the second main calculation to produce the second result.

In one embodiment, the first result, in the calculation of the second selection identifier value, is represented by the first result identifier value.

In one embodiment, the method further comprises using the data structure to find the second result based on the first selection item and the second selection item, wherein the step of using comprises the sub-steps of: (a) calculating the first selection identifier value as a function of at least the first selection item; (b) searching the objects of the data structure based on the first selection identifier value to locate the first result identifier value; (c) if the first result identifier value is found in sub-step (b), calculating the second selection identifier value as a function of the first result identifier value and the second selection item, searching the objects of the data structure based on the second selection identifier value to locate the second result; (d) if the first result identifier value is not found in sub-step (b), executing the first main calculation to produce the first result, calculating the first result identifier value as a function of the first result, calculating the second selection identifier value as a function of the first result identifier value and the second selection item, and searching the objects of the data structure based on the second selection identifier value to locate the second result; (e) if the second result is not found in sub-step (c), searching the objects of the data structure based on the first result identifier value to locate the first result, and executing the second main calculation to produce the second result; (f) if the first result is not found in sub-step (e), executing the first main calculation to produce the first result, and executing the second main calculation to produce the second result; and (g) if the second result is not found in sub-step (d), executing the second main calculation to produce the second result.

In one embodiment, the method further comprises the step of calculating a second result identifier value as a function of the second result, wherein the step of storing further comprises the steps of storing the second selection identifier value and the second result identifier value as associated objects in the data structure, and storing the second result identifier value and the second result as associated objects in the data structure.

In one embodiment, each of the identifier values is statistically unique.

In one embodiment, each of the identifier values is a digital fingerprint generated by a hash function. For example, the digital fingerprint may comprise at least 256 bits.

In one embodiment, the method further comprises the step of selectively deleting data records containing associated objects in the data structure, based at least on the size of the data records. The step of selectively deleting may be configured to promote deleting of data records that contain said first result. In one such embodiment, the method comprises a step of associating each data record with a weight value, which is calculated as a function of a usage parameter for each data record, a calculation time parameter for each data record, and a size parameter for each data record. The weight value may be calculated by evaluating a weight function which is given by $W=U*T/M$, with U being the usage parameter, T being the calculation time parameter, and M being the size parameter. The value of the usage parameter may be incremented whenever the data record is accessed, while being exponentially decreased as a function of time. The step of selectively deleting may be based on the weight value of the data records in the data structure. Further, the step of selectively deleting may be triggered based on a comparison between a current size of the data structure and a threshold value.

In one embodiment, the database is a dynamic database, and the first selection identifier value is calculated as a function of at least the first selection item and the data set.

In one embodiment, the first selection item defines a set of fields in the data set and a condition for each field, wherein the first result is representative of a subset of the data set, wherein the second selection item defines a mathematical function, one or more calculation variables included in the first result and one or more classification variables included in the first result, and wherein the second result is a multidimensional cube data structure containing the result of operating the mathematical function on said one or more calculation variables for every unique value of each classification variable.

A second aspect of the invention is a computer readable medium having stored thereon a computer program which, when executed by a computer, is adapted to carry out the method according to the first aspect.

A third aspect of the invention is an apparatus for extracting information from a database, said apparatus comprising means for executing a sequential chain of main calculations comprising a first main calculation which operates a first selection item on a data set representing the database to produce a first result, and a second main calculation which operates a second selection item on the first result to produce a second result, said apparatus further comprising means for caching the first and second results by: calculating a first selection identifier value as a function of at least the first selection item, and a second selection identifier value as a function of at least the second selection item and the first result; and storing the first selection identifier value and the first result, and the second selection identifier value and the second result, respectively, as associated objects in a data structure.

The apparatus of the third aspect shares the advantages of the method of the first aspect, and may comprise further features corresponding to any of the embodiments described above in relation to the first aspect.

Still other objectives, features, aspects and advantages of the present invention will appear from the following detailed description, from the attached claims as well as from the drawings.

BRIEF DESCRIPTION OF THE DRAWINGS

Embodiments of the invention will now be described in more detail with reference to the accompanying schematic drawings, in which the same reference numerals are used to identify corresponding elements.

DETAILED DESCRIPTION OF EXEMPLARY EMBODIMENTS

The present invention relates to techniques for extracting information from a database. For ease of understanding, some underlying principles will first be discussed in relation to a generalized example. Then, different aspects, features and advantages will be discussed in relation to a specific implementation.

General

Figure 1:
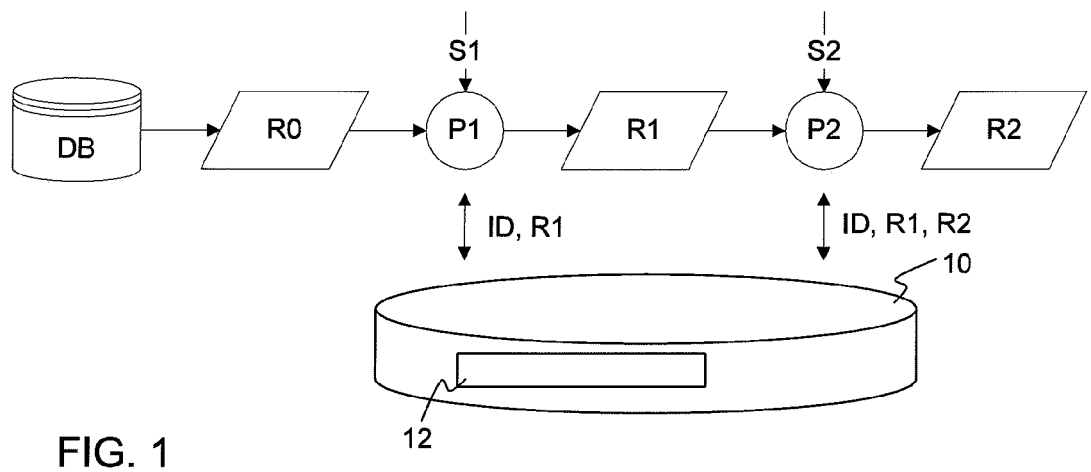
FIG. 1 illustrates a process involving a chain of calculations for extracting information from a database, wherein identifiers and results are selectively stored in and retrieved from a computer memory.

FIG. 1 illustrates an example of a computer-implemented process for extracting information from a database DB, which may or may not be stored externally of the computer that implements the process. The extraction process involves extracting an initial data set or scope R0 from the database DB, e.g. by reading the initial data set R0 into the primary memory (e.g. RAM) of the computer. The initial data set R0 may include the entire contents of the database DB, or a subset thereof.

The process of FIG. 1 involves a sequence of main calculation procedures P1, P2 which operate to generate a final result R2 based on the initial data set R0. Specifically, a first procedure P1 operates on the initial data set R0 to produce an intermediate result R1, and the second procedure P2 operates on the intermediate result to produce the final result R2.

The first procedure P1 is controlled by a first selection item S1, which may or may not originate from user input. Similarly, the second procedure P2 is controlled by a second selection item S2, which may or may not originate from user input. Each selection item S1, S2 may include any combination of variables and/or mathematical functions that define a refinement of the input data to the respective procedure, i.e. the data set R0 and the intermediate result R1, respectively.

FIG. 1 also indicates that the extraction process interacts with a computer memory 10 (typically RAM or cache memory), by the first and second procedures P1, P2 operating to store data items in the memory 10 and retrieve data items from the memory 10. In the illustrated example, the first procedure P1 operates to store and retrieve identifiers, generally denoted by ID, and intermediate results R1, and the second procedure P2 operates to store and retrieve identifiers, generally denoted by ID, intermediate results R1 and final results R2. In the following, the procedure of storing identifiers and results in computer memory 10 is also referred to as "caching".

Different identifiers are typically generated by the procedures P1, P2 as a function of one or more process parameters, such as another identifier and/or a selection item S1, S2 and/or a result R1, R2. Different functions may or may not be used for generating different identifiers. The function(s) for generating an identifier may be a hashing algorithm that generates a digital fingerprint of the relevant process parameter(s). The function/functions is/are suitably configured such that each unique combination of parameter values results in an identifier value which unique among all identifier values that are generated for all different identifiers within the process. In this context, "unique" not only includes theoretically unique identifier values, but also statistically unique identifier values. One non-limiting example of such a function is a hashing algorithm that generates a digital fingerprint of at least 256 bits.

Figure 2:
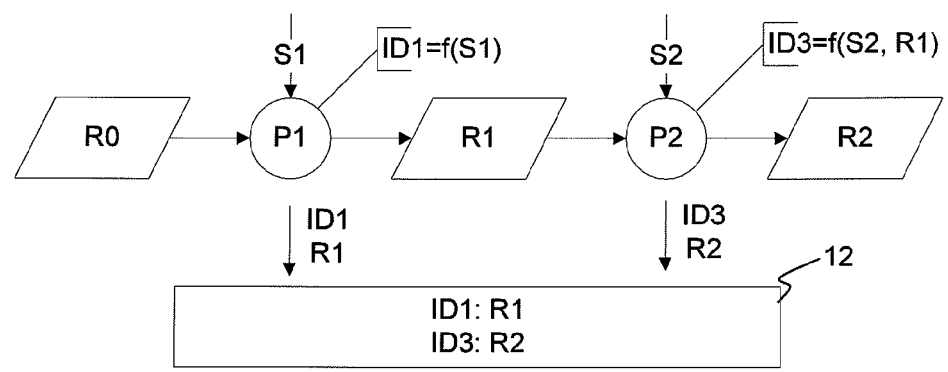
FIG. 2 illustrates one embodiment of the process in FIG. 1.

In one embodiment, further illustrated in FIG. 2, the first procedure P1 is configured to calculate a first selection identifier value ID1 as a function of the first selection item S1, i.e. ID1=f(S1), and the second procedure P2 is configured to calculate a second selection identifier value ID3 as a function of the second selection item S2 and the intermediate result R1, i.e. ID3=f(S2, R1). The first procedure P1 is also configured to store ID1 and the intermediate result R1 as associated objects in a data structure 12 in the computer memory, and the second procedure P2 is configured to store ID3 and R2 as associated objects in the data structure 12. Thus, the data structure 12 in the computer memory 10 is configured to store a heterogeneous set of objects, i.e. objects of different types.

This embodiment enables a reduction in the response time for the extraction process and/or a reduction in the processing requirements of the computer that implements the extraction process, by reducing the necessity to execute the main calculation procedures P1, P2 for calculating the intermediate result R1 and the final result R2, respectively. For example, the extraction process may be configured to use the data structure 12, whenever possible, to find the final result R2 based on the first selection item S1 and the second selection item S2. Thus, when the process discovers a need to calculate the final result R2, based on S1 and S2, it may generate ID1=f(S1) and access the data structure 12 based on ID1. If an identical first selection item S1 has been used with the first procedure P1 before, it is likely that the generated value of ID1 is found is the data structure 12 and associated with the corresponding intermediate result R1. Thus, the intermediate result R1 may be retrieved from the data structure 12 instead of being calculated by the procedure P1. If the intermediate result R1 is not found in the data structure 12, the process may cause the first procedure P1 to calculate the intermediate result R1. Furthermore, after obtaining the intermediate result R1, the process may generate ID3=f(R1, S2) and access the data structure 12 based on ID3. Again, if the same operation has been executed by procedure P2 before, it is likely that the generated value of ID3 is found is the data structure 12 and associated with the corresponding final result R2. Thereby, the final result R2 may be retrieved from the data structure 12 instead of being calculated by the procedure P2.

Figure 3:
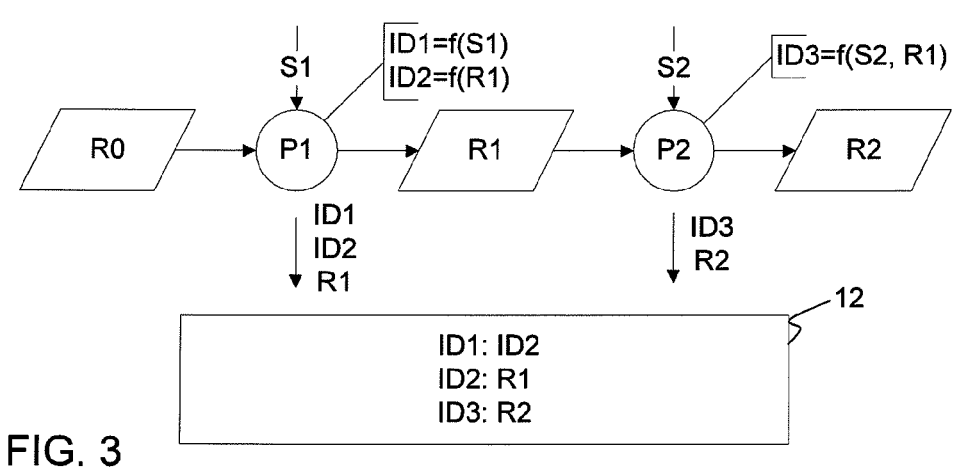
FIG. 3 illustrates another embodiment of the process in FIG. 1.

In one embodiment, further illustrated in FIG. 3, the first procedure P1 is further configured to calculate a first result identifier value ID2 as a function of the intermediate result R1. The first procedure P1 is also configured to store ID1 and ID2 as associated objects in the data structure 12, and to store ID2 and the intermediate result R1 as associated objects in the data structure 12.

This embodiment enables a reduction in the size of the computer memory required by the process, since each intermediate result R1 is only stored once in the data structure 12, even if two or more first selection items S1 yield identical intermediate results R1. This embodiment is particularly relevant when the intermediate results R1 are large, which is often the case when processing information from databases.

Figure 4:
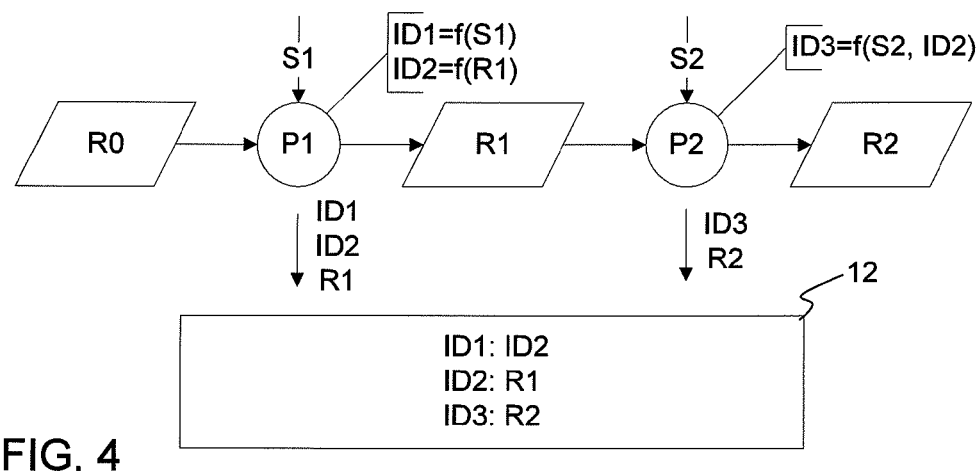
FIG. 4 illustrates yet another embodiment of the process in FIG. 1.

The calculation of the first result identifier value ID2 also enables a further embodiment, illustrated in FIG. 4, in which the intermediate result R1 is represented by the first result identifier value ID2 in the calculation of the second selection identifier value ID3, i.e. ID3=f(ID2, S2).

This embodiment results in a reduced need to store the intermediate result R1 in the data structure 12, since the final result R2 can be retrieved from the data structure 12 based on ID3, which is generated based on ID2, not the intermediate result R1. This enables efficient calculation of the final result R2, even if the intermediate result R1 has been purged from the data structure 12. For example, the process may be configured to use the data structure 12, whenever possible, to find the final result R2 based on the first selection item S1 and the second selection item S2. Thus, when the process discovers a need to calculate the final result R2, based on S1 and S2, it may generate ID1=f(S1) and access the data structure 12 based on ID1 to retrieve ID2 associated therewith, if an identical first selection item S1 has been used with the first procedure P1 before. Then, the process may generate ID3=f(ID2, S2) and access the data structure 12 based on ID3 to retrieve the final result R2 associated therewith, if the second procedure P2 has operated on an identical intermediate result R1 and an identical second selection item S2 before. In this example, the final result R2 can thus be retrieved from the data structure 12 even if the intermediate result R1 has been deleted.

Figure 5:
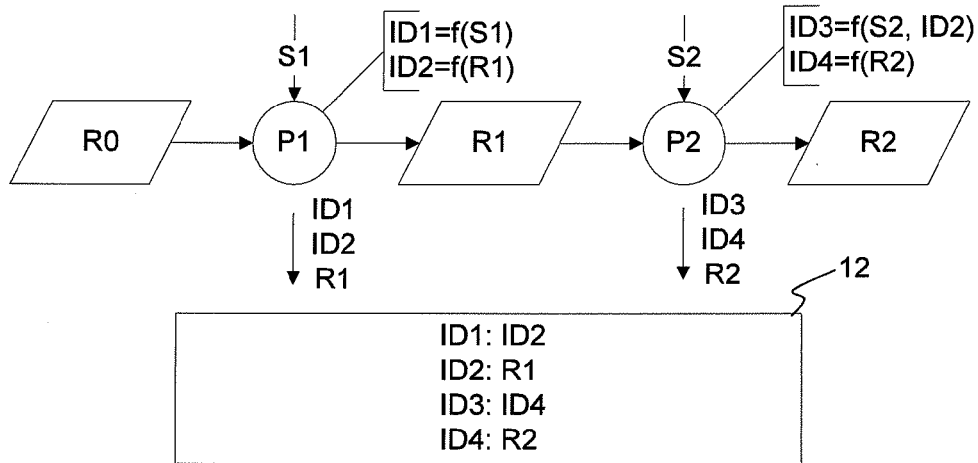
FIG. 5 illustrates yet another embodiment of the process in FIG. 1.

In one embodiment, illustrated in FIG. 5, the first procedure P1 is further configured to calculate a second result identifier value ID4 as a function of the final result R2. The second procedure P2 is also configured to store ID3 and ID4 as associated objects in the data structure 12, and to store ID4 and the final result R2 as associated objects in the data structure 12.

This embodiment enables a reduction in the size of the computer memory required by the process, since each final result R2 is only stored once in the data structure 12, even if two or more second selection items S2 yield identical final results R2. This embodiment is particularly relevant when the final results R2 are large.

Hitherto, the database DB, and thus the data set R0, has been presumed to be static. If the database is dynamic, it may be suitable to generate the first selection identifier ID1 as a function of the first selection item S1 and the data set R0, i.e. ID1=f(S1, R0). With such a modification, all of the embodiments described in relation to FIG. 1-5 are equally applicable to a dynamic database, i.e. a database that may change at any time.

Figure 6:
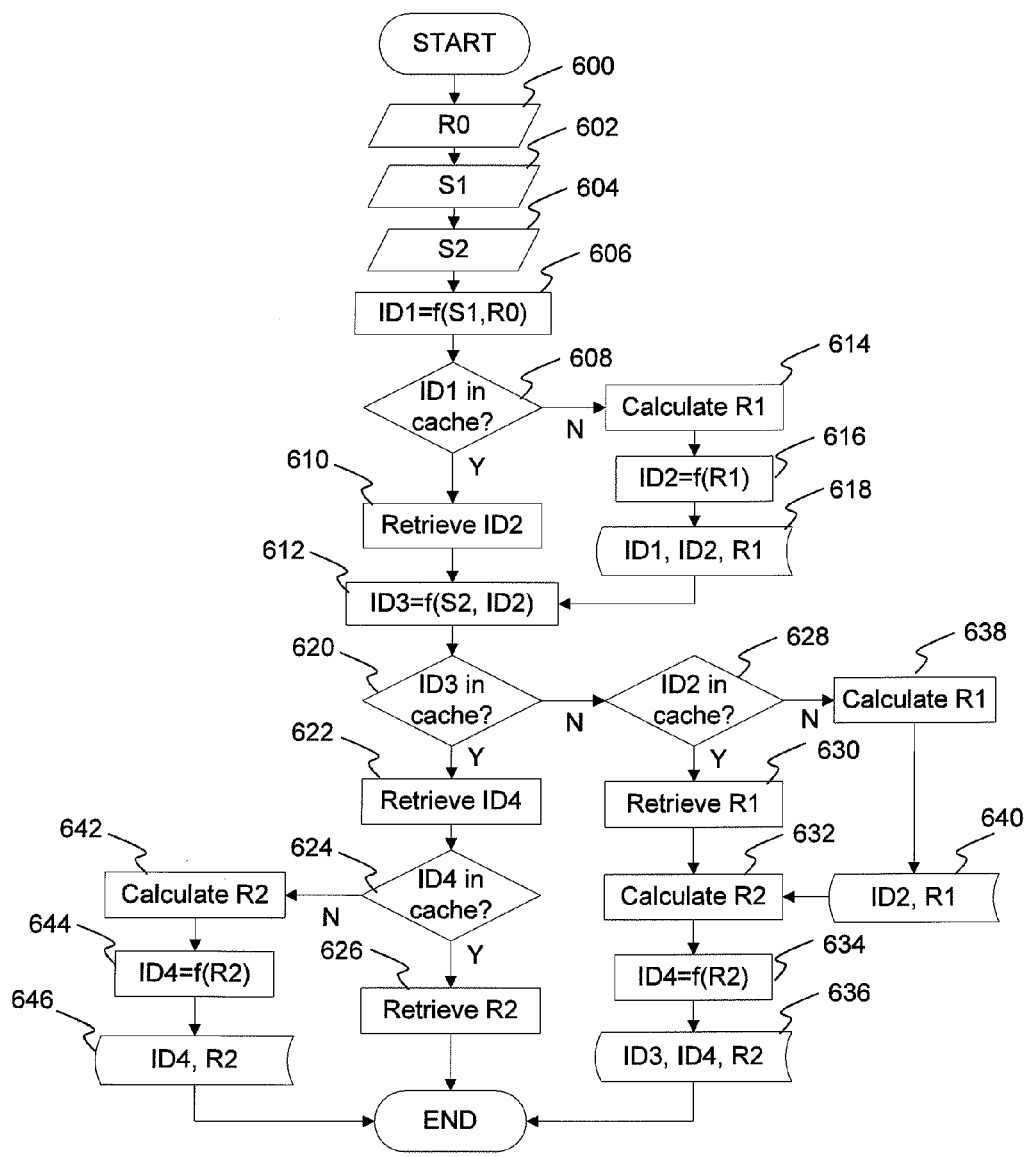
FIG. 6 is an exemplifying flow chart for the process in FIG. 5.

FIG. 6 is a flow chart illustrating one exemplifying implementation of the embodiment in FIG. 5, adapted to operate on a dynamic database. The process starts by inputting the data set R0 (step 600), the first selection item S1 (step 602) and the second selection item S2 (604). Then, a value of the first selection identifier ID1 is generated as a function of S1 and R0 (step 606). A lookup is made in the data structure based on ID1 (step 608). If the value of ID1 is found in the data structure, i.e. has been cached in a previous iteration, the process retrieves the value of the first result identifier ID2 associated therewith (step 610) and proceeds to step 612.

If the value of ID1 is not found in the data structure in step 608, the process causes the first procedure P1 to calculate R1, by operating S1 on R0 (step 614). Then, the value of ID2 is generated as a function of R1 (step 616), and the values of ID1, ID2 and R1 are stored in the data structure in associated pairs ID1:ID2 and ID2:R1 (step 618). The process then proceeds to step 612.

In step 612, the value of the second selection identifier ID3 is generated as a function of S2 and ID2. Then, a lookup is made in the data structure based on ID3 (step 620). If the value of ID3 is found in the data structure, i.e. has been cached in a previous iteration, the process retrieves the value of the second result identifier ID4 associated therewith (step 622). A further lookup is made in the data structure based on ID4 (step 624). If the value of ID4 is found in the data structure, i.e. has been cached in a previous iteration, the process retrieves the final result R2 associated therewith (step 626).

If the value of ID3 is not found in the data structure in step 620, a further lookup is made in the data structure based on the value of ID2 determined in step 610 or step 616 (step 628). If the value of ID2 is found in the data structure, i.e. has been cached in a previous iteration, the process retrieves the first result R1 associated therewith (step 630). The process then causes the second procedure P2 to calculate R2, by operating S2 on R1 (step 632). In order to update the data structure, the process also generates the value of ID4 as a function of R2 (step 634) and stores the values of ID3, ID4 and R2 in the data structure in associated pairs ID3:ID4 and ID4:R2 (step 636).

If the value of ID2 is not found in the data structure in step 628, the process causes the first procedure P1 to calculate R1, by operating S1 on R0 (step 638), and stores the values of ID2 and R1 in the data structure in an associated pair ID2:R1 (step 640). The process then proceeds to step 632. However, it should be realized that if the intermediate result R1 was already calculated in step 614, it is not necessary to perform steps 628, 630, 638 and 640. In such a case, if ID3 is not found in step 620, the process may proceed directly to step 632, in which the second procedure P2 is caused to calculate R2, by operating S2 on R1.

If the value of ID4 is not found in the data structure in step 622, the process causes the second procedure P2 to calculate R2, by operating S2 on R1 (step 642). In order to update the data structure, the process also generates the value of ID4 as a function of R2 (step 644) and stores the values of ID4 and R2 in the data structure in an associated pair ID4:R2 (step 646).

The skilled person readily understands that the embodiments in FIGS. 2-4 result in corresponding storage and retrieval processes, albeit using different combinations of identifiers. For brevity of presentation, these processes are not illustrated in flow charts, but merely given as exemplifying embodiments in the foregoing Summary section.

It is to be understood that any data structure 12, linear or non-linear, may be used for storing the identifiers and results. However, for reasons of processing speed it may be preferable to use a data structure 12 with an efficient index system, such as a sorted list, a hash table, or a binary tree, such as an AVL tree.

SPECIFIC EMBODIMENTS, IMPLEMENTATIONS AND EXAMPLES

In the following, embodiments of the invention are discussed and exemplified in further detail.

In embodiments of the invention, previous calculations and results are used in the processing of successive requests for new data and new calculations. To this end, the extraction process is designed to cache results during the processing of the data requests. When a subsequent request is processed, the extraction process determines if an appropriate previous result has already been generated and cached. If so, the previous result is used in the processing of the subsequent request. Since the prior calculations need not be regenerated, the processing time for the subsequent request may be reduced considerably.

In embodiments of the invention, digital identifiers (digital fingerprints) are used to identify the cached information, and in this way a cached result can be reused also when reached in a different way than in the previous calculation.

In embodiments of the invention, the digital identifiers themselves are stored in the cache. Specifically, the identifier of the input for a calculation procedure is stored together with the digital identifier of the output of the calculation procedure. Hence, the final result of a many-step operation can be reached also when the needed complex intermediate result(s) has been purged from the cache. Only the digital identifier of the intermediate result(s) is needed.

In embodiments of the invention, the cache is implemented by a data structure that can store heterogeneous objects, such as tables, data sub-sets, arrays and digital identifiers.

Embodiments of the invention may thus serve to minimize, or at least reduce, the response times for a user who queries a data storage using a query that has been executed recently by the same or another user.

Embodiments of the invention may also serve to minimize, or at least reduce, the memory usage by the cache by re-using the same cache entry for several different queries or calculations, in the case that two queries or calculations happen to yield the same result.

Embodiments of the invention are applicable for extracting any type of information from any type of known database, such as relational databases, post-relational databases, object-oriented databases, hierarchical databases, etc. The Internet may also be regarded as a database in the context of the present invention.

Figure 7:
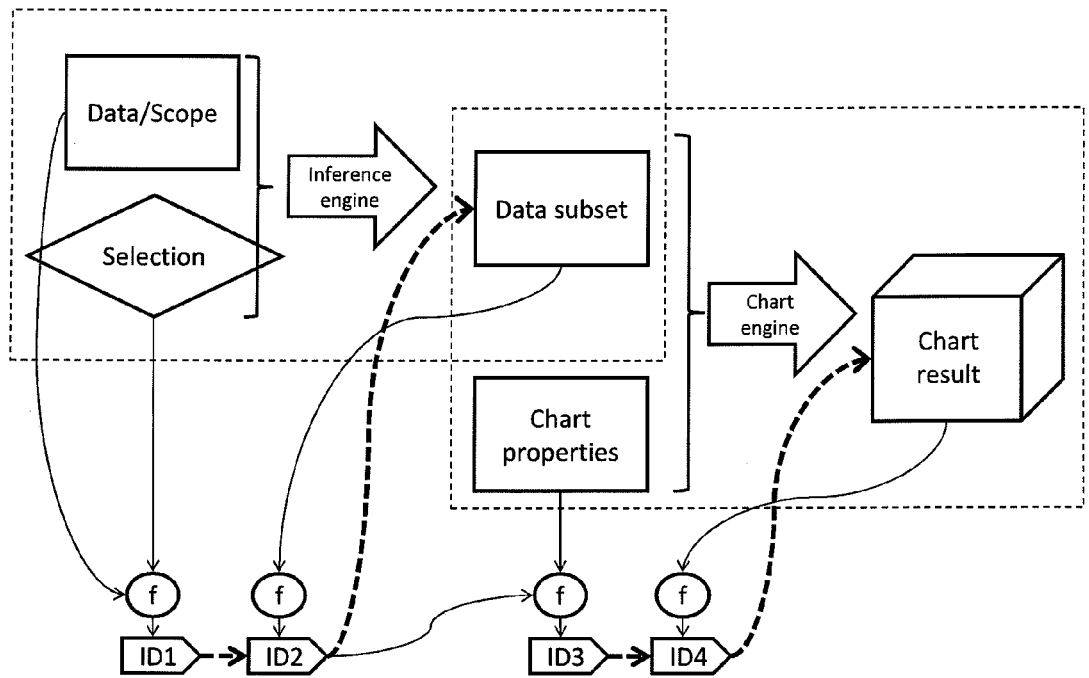
FIG. 7 is an overview of the process in FIG. 5 as implemented in a specific context.

FIG. 7 discloses a specific embodiment of the invention, which is an extraction process or information search that involves a database query with a subsequent chart calculation based on the query result. The result of the chart calculation, denoted Chart Result, is typically data which is aggregated, sorted or grouped in one, two or multiple dimensions, e.g. in the form of a multidimensional cube as discussed in the Background section.

In a first step, the Scope for the information search is defined. In the case of a database query, the scope is defined by the tables included in a SELECT statement (or equivalent) and how these are joined. For an Internet search, the scope may be an index of found web pages, usually also organized as one or more tables. The output of the first step is thus a data set (cf. R0 in FIGS. 1-6).

In a second step, a user makes a Selection in the data set, causing an Inference Engine to evaluate a number of filters on the data set. The inference engine could be e.g. a database engine, a query tool or a business intelligence tool. For example, in a query on a database that holds data of placed orders, this could be demanding that the order year be '2007' and the product group be 'Dairy products'. The selection may thus be uniquely defined by a list of included fields and, for each field, a list of selected values or, more generally, a condition.

Based on the selection (cf. S1 in FIGS. 1-6), the inference engine executes a calculation procedure (cf. P1 in FIGS. 1-6) to generate a Data subset (cf. R1 in FIGS. 1-6) that represents a part of the scope (cf. R0 in FIGS. 1-6). The data subset may thus contain a set of relevant data records from the scope, or a list of references (e.g. indices, pointers or binary numbers) to these relevant data records. In the above example, the relevant data records would be only the data records that pertain to the year '2007' and to the product group 'Dairy products'.

If the selection has never been made before, the inference engine in FIG. 7 is operated to calculate the data subset. However, if the calculation has been made before, the inference engine is instead operated to re-use the previous result by accessing a specific data structure: a "cache".

The next step is often to make some further calculations, e.g. aggregation(s) and/or sorting(s) and/or grouping(s), based on the data subset. In the example of FIG. 7, these subsequent calculations are made by a Chart Engine that calculates the Chart Result based on the data subset and a selected set of Chart Properties (cf. S2 in FIGS. 1-6). The chart engine thus executes a chart calculation procedure (cf. P2 in FIGS. 1-6) to generate the chart result (cf. R2 in FIGS. 1-6). If these calculations have never been made before, the chart engine in FIG. 7 is operated to generate the chart result. However, if these calculations have been made before, the chart engine is instead operated to re-use the previous result by accessing the aforesaid cache. The chart result may then be visualized to a user in pivot tables or graphically in 2D and 3D charts.

FIG. 7 also illustrates the process of using the cache, with f representing the hashing algorithm that is operated to generate digital identifiers, ID1-ID4 representing the thus-generated digital identifiers, and solid line arrows representing the flow of data for generation of the identifiers ID1-ID4. Further in FIG. 7, dashed arrows represent cache look-ups.

In FIG. 7, when a user makes a new selection, the inference engine calculates the data subset. Also, the identifier ID1 for the selection together with the scope is generated based on the filters in the selection and the scope. Subsequently, the identifier ID2 for the data subset is generated based on the data subset definition, typically a bit sequence that defines the content of the data subset. Finally, ID2 is put in the cache using ID1 as lookup identifier. Likewise, the data subset definition is put in the cache using ID2 as lookup identifier.

In FIG. 7, the chart calculation takes place in a similar way. Here, there are two information sets: the data subset and the relevant chart properties. The latter is typically, but not restricted to, a mathematical function together with calculation variables and classification variables (dimensions). Both of these information sets are used to calculate the chart result, and both of these information sets are also used to generate the identifier ID3 for the input to the chart calculation. ID2 was generated already in the previous step, and ID3 is generated as the first step in the chart calculation procedure.

The identifier ID3 is formed from ID2 and the relevant chart properties. ID3 can be seen as an identifier for a specific chart generation instance, which includes all information needed to calculate a specific chart result. In addition, a chart result identifier ID4 is created from the chart result definition, typically a bit sequence that defines the chart result. Finally, ID4 is put in the cache using ID3 as lookup identifier. Likewise, the chart result definition is put in the cache using ID4 as lookup identifier.

In this specific example, a two-step caching of the result is performed in both the inference procedure and the chart calculation procedure. In the inference procedure, ID1 and ID2 represent different things: the selection and the data subset definition, respectively. If two different selections yield the same data subset, which is quite possible, the two-step caching (ID1:ID2; ID2: data subset) causes the data subset to be cached only once. This is denoted Object Folding in the following, i.e. several data objects in the cache share the same cache entry. Similarly, in the chart calculation procedure, ID3 and ID4 represent different things: the chart generation instance and the chart result definition, respectively. If two different chart generation instances yield the same chart result, which is quite possible, the two-step caching (ID3: ID4; ID4: chart result) causes the chart result to be cached only once.

Further, by caching ID3, the chart result can be recreated also if the data subset definition has been purged from the cache. This is a relevant advantage since the data subset definition can be very large and hence prone to get purged from the cache if a cache purging mechanism is implemented. A non-limiting example of such a mechanism will be described further below.

During the extraction process, identifiers are calculated from the selection, the relevant chart properties, etc. and used to lookup possibly cached calculation results, as indicated by the dashed arrows in FIG. 7. If the identifier is found, the corresponding cached result will be re-used. If not found, the extraction process will generate new identifiers and cache them with the respective result.

To further exemplify the extraction process, consider the above-mentioned selection of order year '2007' and product group 'Dairy products'. The first step is to generate a digital identifier ID1 as a function of this selection, e.g. (written in hexadecimal notation):

'31dca7ad013964891df428095ad9b78ad7a69eaaa1ca3886bcf05d8f8184e84a'.

For the sake of brevity, each identifier is represented by its initial 4 characters in the following example. So, ID1 instead becomes '31dc'. Furthermore, for reasons of clarity the illustrating tables below include identifier labels, e.g. 'ID1:' in front of the digital identifiers. This is not necessary in the real solution.

The subsequent extraction process is the following: When ID1 has been generated, it is looked for in the cache. The first time the selection is made, this identifier will not be found in the cache, so the resulting data subset must be calculated the normal way. Once this is done, ID2 can be generated from the data subset to be e.g. 'd2b8'. Then ID1 is cached, pointing at ID2; and ID2 is cached, pointing at the bit sequence that defines the resulting data subset. This bit sequence can be considerable in size. The content of the cache is shown in Table 1 below.

TABLE 1

| ID | Cached value |
|---|---|
| ID1:31dc | ID2:d2b8 |
| ID2:d2b8 | <data records in resulting data subset> |

The next time the same selection is made, the process will be different: Now ID1 is found in the cache, pointing at 'ID2:d2b8', which in turn is used for a second look-up, whereupon the bit sequence of the resulting data subset is found, retrieved and used instead of a time-consuming calculation.

Now consider the case where a different selection is made, but yielding the same resulting data subset. For example, it may happen that a user selects exactly those customers that have bought 'Dairy products' without explicitly demanding 'Dairy products' and these have bought nothing but dairy products. ID1 is now generated as e.g. 'f142', and will not be found in the cache. So, the resulting data subset must be calculated the normal way. Once this is done, ID2 can be generated from the data subset, and is found to be 'd2b8', which already is stored in the cache. So, the algorithm need only add one entry to the cache, the one where 'D1:f142' points to 'ID2:d2b8'. The content of the cache is shown in Table 2 below.

TABLE 2

| ID | Cached value |
|---|---|
| ID1:f142 | ID2:d2b8 |
| ID1:31dc | ID2:d2b8 |
| ID2:d2b8 | <data records in resulting data subset> |

No calculation time was saved, this time, but cache entries are re-used to prevent the cache from growing unnecessarily. And now both 'D1:f142' and 'ID1:31dc' point to the cache entry containing the same resulting data subset: 'ID2:d2b8', and both can be used in later look-ups. This is thus an example of the aforesaid "object folding".

A further advantage of caching digital identifiers will become clear when the subsequent chart calculation is performed. So, assume that the above selections have been made and the subsequent chart calculation has been performed. ID3 and ID4 have been generated as 'e40A' and '7505', respectively, and stored in the cache. The content of the cache is shown in Table 3 below.

TABLE 3

| ID | Cached value |
|---|---|
| ID1:f142 | ID2:d2b8 |
| ID1:31dc | ID2:d2b8 |
| ID2:d2b8 | <data records in resulting data subset> |
| ID3:e40A | ID4:7505 |
| ID4:7505 | <matrix of numbers representing chart result> |

Of the five entries in Table 3, one is most likely to be considerably larger than all other: 'ID2:d2b8' containing the entire bit sequence that defines the potentially large data subset. Its size makes it a candidate to be purged when/if the cache is maintained, as described further below. So, after a while the content of the cache may be as shown in Table 4 below.

TABLE 4

| ID | Cached value |
|---|---|
| ID1:f142 | ID2:d2b8 |
| ID1:31dc | ID2:d2b8 |
| ID3:e40A | ID4:7505 |
| ID4:7505 | <matrix of numbers representing chart result> |

However, since the digital identifiers are cached, it is still possible to obtain the chart result without having to recalculate the intermediate data subset. Instead, when the selection is made, ID1 is calculated. Next, a look-up of ID1 is made in the cache, resulting in ID2 being retrieved. ID3 is subsequently generated from the combination of the relevant chart properties and ID2. A look-up of ID3 in the cache is made, and ID4 is retrieved. Finally, a look-up of ID4 in the cache is made and the chart result is recuperated. Hence, the chart result is found without any heavy calculations, but only based on digital identifiers, which may be generated by fast and processing-efficient operations.

From the above, it is understood that the digital identifiers should be unique so that the meaning of each identifier in the cache is unambiguous. In one embodiment, the digital identifiers are generated using a hashing algorithm or function. Hashing algorithms are transformations that take an input of arbitrary size (the message) and re-turn a fixed-size string, which is called the hash value (message digest). The algorithm typically chops and mixes, e.g. substitutes or transposes, the input to create a digital fingerprint thereof. The simplest and oldest hashing algorithms are simple modulo by prime operations. Hashing algorithms are used for a variety of computational purposes, including cryptography. Generally speaking, a hashing algorithm should behave as much as possible like a random function, by generating any possible fixed-size string with equal "probability", while still really being deterministic.

There are several well-known and frequently used hashing algorithms that may be used for generating the above-mentioned digital identifiers. Different hashing algorithms are optimized for different purposes, some being optimized for efficient and fast computation of the hash value, whereas others are designed for high cryptographic safety. An algorithm with high cryptographic safety is designed to make it difficult to calculate a message that matches a given hash value within reasonable time, and to find a second message that generates the same hash value as a first given message. Such hashing algorithms include SHA (Secure Hash Algorithm) and MD5 (Message-Digest algorithm 5). Processing-efficient hashing algorithms typically exhibit lower cryptographic safety. Such hashing algorithms include FNV algorithms (Fowler/Noll/Vo), which are designed to be fast while generally maintaining a very low collision rate. An FNV algorithm typically starts with an offset base, which in principle could be any random string of values, but typically by tradition always is the signature of the inventor in hexadecimal code run through the original FNV-0 algorithm. For generating a 256-bit FNV hash value, the following offset base is usually used:

'0xdd268dbcaac550362d98c384c4e576ccc8b1536847b6bbb31023b4c8caee0535'.

For each byte in the input to the hashing algorithm, the offset is first multiplied by a large prime number, then subsequently compared with the byte from the input and finally the bitwise symmetric difference (XOR) is calculated to form the hash value for the next loop. Appropriate prime numbers are found in open literature. Any large prime numbers will work, but some are more collision-resistant than others.

The digital identifiers may be generated using any hashing algorithm, which is reasonably collision-resistant. In one embodiment, the identifiers are generated using a fast hashing algorithm with high collision resistance and low cryptographic safety.

In one specific embodiment, a 256-bit identifier may be created by concatenating four 64-bit FNV hashes, each generated using a different prime multiplier. By using four shorter hashes and concatenating them, the identifier can be generated faster. To further speed up the generation of the identifier, the algorithm may be modified to use not only one byte of the input per loop, but instead four bytes. This may result in a loss of cryptographic safety, while the collision resistance remains roughly the same.

Identifiers with a length of at least 256 bits may yield a beneficial collision-resistance. A 256-bit hash value means that there are approximately 1E+77 possible identifier values. This number can be compared to the number of atoms in the universe which has been estimated to 1E+80. This means that the risk of collisions, i.e. the risk that two different selections/data subsets/chart properties/chart results yield the same identifier, is not only extremely small, but negligible. So we can safely say that the risk of collisions is acceptably small. This means that although the hashing algorithm does not generate theoretically unique identifiers, it does however generate statistically unique identifiers. However, it to be understood that identifiers of shorter bit length, such as 64 or 128 bits, may be sufficiently statistically unique for a specific application.

As mentioned above, a purging mechanism may be implemented to purge the cache of old or unused entries. One strategy may be to eliminate the lowest-usage entry/entries in the cache. However, a more advanced purging mechanism may be implemented to support optimization of both processor usage and memory usage. One embodiment of such an advanced purging mechanism operates on three parameters: Usage, Calculation time and Memory need.

The Usage parameter is a numeric value that may consider both if an entry has been accessed "recently, but not often" and if the entry has been accessed "often, but not recently". This may be accomplished by associating each entry with a usage parameter U which is increased by e.g. one unit every time the entry is accessed, but decreases its value exponentially, or by any other function, over time. In one implementation, all values of U in the cache are periodically reduced by a fixed amount. Thus, the usage parameter has a half-life, similar to a radioactive decay. The value of U will now reflect how much and how recently the entry has been accessed.

If the processor time needed to calculate an entry is considerable, then the entry should be kept longer in the cache. Conversely, if the processor time needed for the calculation is small, then the cost of re-calculating is small and the benefit of keeping the entry in the cache is also small. Thus, each entry is associated with a time parameter T that represents the estimated calculation time.

If the memory space needed to store an entry is considerable, then it costs a lot of the cache resources to keep it and it should be purged from the cache sooner than an entry that requires less memory space. Conversely, an entry requiring little memory space can be kept longer in the cache. Thus, each entry is associated with a memory parameter M that represents the estimated memory need.

For each entry in the cache, the values of the U, T and M parameters are evaluated by a weight function W given by: $W=U*T/M$.

A large value of W for an entry indicates that there are good reasons to keep this entry in the cache. Thus, the entries with large W values should be kept in the cache and the ones with small W values should be purged.

An efficient purging mechanism may involve sorting the cache according to the W values and purging the sorted cache from one end, i.e. the entries with the smallest W values. One possible, but not necessary, way to keep a sorted cache would be to store the identifiers, results and U, T, M and W values as an AVL (Adelson-Velsky and Landis) tree, i.e. a self-balancing binary search tree.

The purging mechanism may intermittently purge all entries with a W value that falls below a predetermined threshold value.

Alternatively, the purging mechanism may be controlled by the amount of available memory on the computer, or the ratio of available memory to total memory. Thus, whenever the size of the cache memory reaches a memory threshold value, the purging mechanism removes entries from the cache entries based on their respective W value. By setting the memory threshold, it is possible to adapt the cache size to the local hardware conditions, e.g. to trade processing power for memory. For example, it is possible to compensate for a slower processor in a computer by adding more primary memory to the computer and increasing the memory threshold. Thereby, more results will retained in the cache and the need for processing will be reduced.

Embodiments of the invention also relate to an apparatus for performing any one of the algorithms, methods, processes and procedures described in the foregoing. This apparatus may be specially constructed for the required purpose or it may comprise a general-purpose computer which is selectively activated or reconfigured by a computer program stored in the computer.

Figure 8:
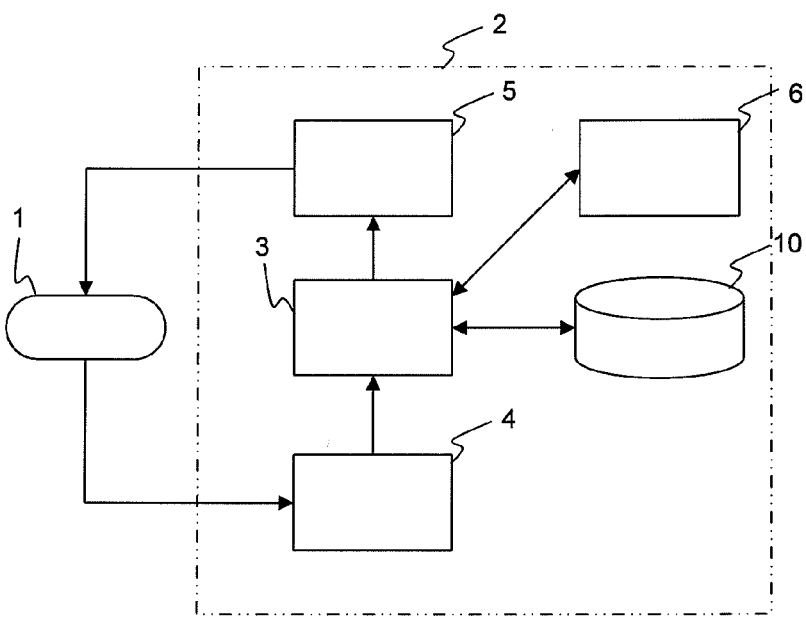
FIG. 8 is a block diagram of a computer-based environment for implementing embodiments of the invention.

FIG. 8 is a block diagram of a computer-based environment for implementing any of the embodiments of the invention. A user 1 interacts with a data processing system 2, which includes a processor 3 that executes operating system software as well as one or more application programs that implement an embodiment of the invention. The user enters information into the data processing system 2 by using one or more well-known input devices 4, such as a mouse, a keyboard, a touch pad, etc. Alternatively, the information may be entered with or without user intervention by another type of input device, such as a card reader, an optical reader, or another computer system. Visual feedback may be given to the user by showing characters, graphical symbols, windows, buttons, etc, on a display 5. The data processing system further includes the aforesaid memory 10. The software executed by the processor 3 stores information relating to the operation thereof in the memory 10, and retrieves appropriate information from the memory 10. The memory 10 typically includes a primary memory (such as RAM, cache memory, etc) and a non-volatile secondary memory (hard disk, flash memory, removable medium). The database may be stored in the memory 10 of the data processing system, or it may be accessed on an external storage device via a communications interface 6 in the data processing system 2.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the present invention is not only applicable for calculating multidimensional cubes, but may be useful in any situation where information is extracted from a database using a chain of calculations.

Further, the inventive extraction process may be applied to a chain of calculations that involve more than two consecutive calculations. For example, each of two or more intermediate results in a chain of calculations may be cached and subsequently retrieved similarly to the intermediate result as described in the foregoing.

Further, the inventive extraction process need not cache and subsequently retrieve the final result, but may instead operate only to cache and retrieve one or more intermediate results in a chain of calculations.

Still further, it should be realized that the initial step of extracting an initial data set or scope from the database may be omitted, and the extraction process may instead operate directly on the database.

The invention claimed is:

1. A computer-implemented method for retrieving information from a database, said method comprising:
   performing a first main calculation (P1) which operates a first selection item (S1) on a data set (R0) representing the database to produce an intermediate result (R1);
   performing a second main calculation (P2) which operates a second selection item (S2) on the intermediate result (R1) to produce a final result (R2);
   caching the intermediate and final results (R1, R2) by:
   calculating a first selection identifier value (ID1) as a digital fingerprint generated by a hash function of the first selection item (S1), calculating a second selection identifier value (ID3) as a digital fingerprint generated by a hash function of the second selection item (S2) and the intermediate result (R1); and
   storing the first selection identifier value (ID1) and the intermediate result (R1) as associated objects in a cache data structure, and storing the second selection identifier value (ID3) and the final result (R2) as associated objects in the cache data structure;
   retrieving the cached final result (R2) the first selection item (S1) and the second selection item (S2), by:
   (a) calculating the first selection identifier value (ID1) as a digital fingerprint generated by a hash function of the first selection item (S1);
   (b) searching the objects of the cache data structure for the first selection identifier value (ID1) to locate and retrieve the associated intermediate result (R1); and
   (c) calculating the second selection identifier value (ID3) as a digital fingerprint generated by a hash function of the second selection item (S2) and the retrieved intermediate result (R1) and searching the objects of the cache data structure for the second selection. identifier value (ID3) to locate and retrieve the associated final result (R2).

2. The method of claim 1, further comprising:
   calculating an intermediate result identifier value (ID2) as a digital fingerprint generated by a hash function of the intermediate result (R1), wherein the step of storing further comprises:
   storing the first selection identifier value (ID1) and the intermediate result identifier value (ID2) as associated objects in the cache data structure; and
   storing the intermediate result identifier value (ID2) and the intermediate result (R1) as associated objects in the cache data structure.

3. The method of claim 2, further comprising retrieving the cached final result (R2) using the first selection item (S1) and the second selection item (S2), by:
   (a) calculating the first selection identifier value (ID1) as a digital fingerprint generated by a hash function of at least the first selection item (S1);
   (b) searching the objects of the cache data structure for the first selection identifier value (ID1) to locate and retrieve the associated intermediate result identifier value (ID2);
   (c) searching the objects of the cache data structure for the intermediate result identifier value (ID2) to locate and retrieve the associated intermediate result (R1);
   (d) calculating the second selection identifier value (ID3) as a digital fingerprint generated by a hash function of the retrieved intermediate result (R1) and the second selection item (S2);
   (e) searching the objects of the cache data structure for the second selection identifier value (ID3) to locate and retrieve the associated final result (R2).

4. The method of claim 2, wherein the intermediate result (R1), in the calculation of the second selection identifier value (ID3), is represented by the intermediate result identifier value (ID2).

5. The method of claim 4, further comprising:
   retrieving the cached final result (R2) using the first selection item (S1) and the second selection item (S2), by:
   (a) calculating the first selection identifier value (ID1) as a digital fingerprint generated by a hash function of at least the first selection item (S1);

(b) searching the objects of the cache data structure for the first selection identifier value (ID1) to locate and retrieve the associated intermediate result identifier value (ID2);

(c) calculating the second selection identifier value (ID3) as a digital fingerprint generated by a hash function of the retrieved intermediate result identifier value (ID2) and the second selection item (S2), and searching the objects of the cache data structure based on the second selection identifier value (ID3) to locate and retrieve the final result (R2).

6. The method of claim 1 further comprising calculating a final result identifier value (ID4) as a digital fingerprint generated by a hash function of the final result (R2), wherein the step of storing further comprises:

storing the second selection identifier value (ID3) and the final result identifier value (ID4) as associated objects in the cache data structure; and storing the final result identifier value (ID4) and the final result (R2) as associated objects in the cache data structure.

7. The method of claim 1, wherein each of the identifier values is unique with respect to the other identifier values.

8. The method of claim 1, wherein each of the identifier values is a digital fingerprint that comprises at least 256 bits.

9. The method of claim 1, further comprising the step of selectively deleting data records containing said associated objects in the data structure, based at least on the size of the data records.

10. The method of claim 9, wherein the step of selectively deleting is configured to promote deleting of data records that contain said intermediate result (R1).

11. The method of claim 9, further comprising the step of associating each data record with a weight value, which is calculated as a function of a usage parameter for each data record, a calculation time parameter for each data record, and a size parameter for each data record.

12. The method of claim 11, wherein the weight value is calculated by evaluating a weight function which is given by W=U*T/M, with U being the usage parameter, T being the calculation time parameter, and M being the size parameter.

13. The method of claim 11, wherein the value of the usage parameter is incremented whenever the data record is accessed, while being exponentially decreased as a function of time.

14. The method of claim 11, wherein the step of selectively deleting is based on the weight value of the data records in the data structure.

15. The method of claim 9, wherein the step of selectively deleting is triggered based on a comparison between a current size of the data structure and a threshold value.

16. The method of claim 1, wherein the database is a dynamic database, and the first selection identifier value (ID1) is calculated as a digital fingerprint generated by a hash function of at least the first selection item (S1) and the data set (R0).

17. The method of claim 1, wherein said information comprises a grouping, sorting or aggregation of data in the database.

18. The method of claim 1, wherein the first selection item (S1) defines a set of fields in the data set (R0) and a condition for each field, wherein the intermediate result (R1) is representative of a subset of the data set (R0), wherein the second selection item (S2) defines a mathematical function, one or more calculation variables included in the intermediate result (R1) and one or more classification variables included in the intermediate result (R1), and wherein the final result (R2) is a multidimensional cube data structure containing the result of operating the mathematical function on said one or more calculation variables for every unique value of each classification variable.

19. A computer readable medium storing a computer program product for retrieving information from a database, the computer readable medium comprising:

computer program code for performing a first main calculation (P1) which operates a first selection item (S1) on a data set (R0) representing the database to produce an intermediate result (R1);

computer program code for performing a second main calculation (P2) which operates a second selection item (S2) on the intermediate result (R1) to produce a final result (R2); and computer program code for caching the intermediate and final results (R1, R2) using:

computer program code for calculating a first selection identifier value (ID1) as a digital fingerprint generated by a hash function of the first selection item (S1), and calculating a second selection identifier value (ID3) as a digital fingerprint generated by a hash function of the second selection item (S2) and the intermediate result (R1); and computer program code for storing the first selection identifier value (ID1) and the intermediate result (R1) as associated objects in a cache data structure, and storing the second selection identifier value (ID3) and the final result (R2) as associated objects in the cache data structure;

computer program code for retrieving the cached final result (R2) using the first selection item (S1) and the second selection item (S2), by:

(a) calculating the first selection identifier value (ID1) as a digital fingerprint generated by a hash function of the first selection item (S1);

(b) searching the objects of the cache data structure for the first selection identifier value (ID1) to locate and retrieve the associated intermediate result (R1); and (c) calculating the second selection identifier value (ID3) as a digital fingerprint generated by a hash function of the second selection item (S2) and the retrieved intermediate result (R1) and searching the objects of the cache data structure for the second selection identifier value (ID3) to locate and retrieve the associated final result (R2).

20. An apparatus for retrieving information from a database, said apparatus comprising:

means for executing a sequential chain of main calculations comprising:

a first main calculation (P1) which operates a first selection item (S1) on a data set (R0) representing the database to produce a intermediate result (R1); and a second main calculation (P2) which operates a second selection item (S2) on the intermediate result (R1) to produce a final result (R2); and means for caching the intermediate and final results (R1, R2) by:

calculating a first selection identifier value (ID1) as a digital fingerprint generated by a hash function of the first selection item (S1), calculating a second selection identifier value (ID3) as a digital fingerprint generated by a hash function of the second selection item (S2) and the intermediate result (R1); and storing the first selection identifier value (ID1) and the intermediate result (R1) as associated objects in a cache data structure, and storing the second selection identifier value (ID3) and the final result (R2) as associated objects in the cache data structure;

means for retrieving the cached final result (R2) using the first selection item (S1) and the second selection item (S2), by:
  (a) calculating the first selection identifier value (ID1) as a digital fingerprint generated by a hash function of the first selection item (S1);
  (b) searching the objects of the cache data structure for the first selection identifier value (ID1) to locate and retrieve the associated intermediate result (R1); and
  (c) calculating the second selection identifier value (ID3) as a digital fingerprint generated by a hash function of the second selection item (S2) and the retrieved intermediate result (R1) and searching the objects of the cache data structure for the second selection identifier value (ID3) to locate and retrieve the associated final result (R2).

* * * * *